United States Patent
Bigelow et al.

(10) Patent No.: US 7,091,872 B1
(45) Date of Patent: Aug. 15, 2006

(54) CONTROLLED POWER SOURCE FOR UNDERGROUND LINE LOCATION

(75) Inventors: Russell N. Bigelow, Half Moon Bay, CA (US); Stevan Polak, Aptos, CA (US); James Long, Sunnyvale, CA (US); Joseph Shtargot, Foster City, CA (US)

(73) Assignee: Metrotech Corporation, Santa Clara, CA (US)

( * ) Notice: Subject to any disclaimer, the term of this patent is extended or adjusted under 35 U.S.C. 154(b) by 329 days.

(21) Appl. No.: 10/189,286

(22) Filed: Jul. 1, 2002

(51) Int. Cl.
*G08B 21/00* (2006.01)

(52) U.S. Cl. ............... 340/664; 340/310.15; 340/537; 340/538; 340/870.39; 323/208; 333/124

(58) Field of Classification Search ........... 340/664, 340/310.01, 506, 532, 538, 825.06, 310.04, 340/310.06, 310.03, 853.2, 853.3, 870.39, 340/855.8, 855.9, 310.11, 310.12, 310.15, 340/310.16, 537, 538.14; 324/522, 127, 324/543, 691, 347, 541, 642, 66, 67, 512; 333/124, 16; 323/208; 307/126, 131
See application file for complete search history.

(56) References Cited

U.S. PATENT DOCUMENTS

| | | | |
|---|---|---|---|
| 3,747,082 A * | 7/1973 | Ottenstein | 340/870.23 |
| 4,866,388 A * | 9/1989 | Cosman et al. | 324/326 |
| 5,272,722 A * | 12/1993 | Tran | 375/219 |
| 5,565,783 A * | 10/1996 | Lau et al. | 324/522 |
| 6,166,532 A * | 12/2000 | Coia et al. | 324/67 |
| 6,229,432 B1 * | 5/2001 | Firdley et al. | 340/310.01 |
| 6,265,881 B1 * | 7/2001 | Meliopoulos et al. | 324/691 |
| 6,275,144 B1 * | 8/2001 | Rumbaugh | 340/310.01 |
| 6,331,765 B1 * | 12/2001 | Yamamoto et al. | 323/210 |
| 6,388,575 B1 * | 5/2002 | Galloway | 340/572.1 |
| 6,433,978 B1 * | 8/2002 | Neiger et al. | 361/42 |
| 6,452,482 B1 * | 9/2002 | Cern | 340/310.01 |

* cited by examiner

*Primary Examiner*—Davetta W. Goins
(74) *Attorney, Agent, or Firm*—Finnegan, Henderson, Farabow, Garrett, & Dunner, L.L.P.

(57) ABSTRACT

A transmitter for a line locator system that controls the electrical current, voltage or power applied to the target line is disclosed. Control of the electrical output of the transmitter can be achieved passively or by means of a feedback control system. A transmitter connected directly to a line can include an operator control and monitoring of current being supplied to a line to be located. Some transmitters include a current regulating circuit that controls current supplied to a line. In some transmitters, feedback controllers and feedback loops are used to regulate output current, voltage or power. Some control loops are based on monitoring currents in circuits; some control loops monitor power output from an inductive mode transmitter antenna. An inductively coupled transmitter with power output control is also disclosed.

31 Claims, 5 Drawing Sheets

CONTROLLED POWER SOURCE FOR UNDERGROUND LINE LOCATION

BACKGROUND

1. Field of the Invention

This invention relates to the field of underground line location systems and, in particular, to devices for electrically coupling power to concealed objects so that they can be located by an underground line locator.

2. Related Art

Underground line locators are used to locate the position of lines buried in the ground (i.e., underground lines) such as gas pipes, water pipes, telephone cables, and power cables. A line locator system typically includes a transmitter and a receiver. The transmitter can be electrically coupled to the underground line to be located to cause an electric current to flow in that underground line, which results in the emission of a magnetic field from that line. The receiver locates the underground line by detecting the radiated magnetic field from the underground line.

In a direct connection mode, the transmitter is conductively coupled to the line to be located, typically at a point in the line that is above the ground. The transmitter generates a voltage at one end of the line, causing an electrical current to flow along the conductive line, which produces an electromagnetic field around the line. The electromagnetic field penetrates the ground surface and exists above ground where the receiver can detect it.

In instances where direct connection to the line is not possible (e.g., the line is completely underground), the transmitters of line locators can operate in an inductive mode. The transmitter of an inductive mode line locator produces current in the line by mutual electromagnetic induction. A time-varying electromagnetic field is radiated by an antenna and induces a current in the line to be located. The current produces an electromagnetic field around the line that can be detected by the receiver.

To locate the line, an operator typically moves the receiver over the surface of the ground until the receiver indicates the location of the source of the magnetic field and, therefore, the location of the underground line. The ability of the receiver to locate a line depends on the strength of the electromagnetic field, which is proportional to the electrical current in the buried line. According to Ohm's Law, the current is inversely proportional to the impedance of the line. Because of the wide variability of the physical condition of buried lines and the wide variability of the environment in which those lines are buried, the impedance of buried lines can vary over a wide range. The current produced by the transmitter of a typical locator system varies with the different impedance encountered in each line. The strength of the magnetic field generated by the current within the line, then, varies with the impedance and determines whether or not a receiver above the ground can locate the line with any accuracy.

However, it may be necessary to control the output voltage of the transmitter in order to prevent damaging the underground line or to comply with regulations such as those of the Federal Communications Commission. At present, conventional transmitters in line locator systems control the voltage applied to the underground line, and therefore allow the output current to depend on the impedance of the line, while attempting to maximize the electrical power transmitted into the line. However, the resulting magnetic signal generated from the underground line varies with the impedance of the underground line such that the ability of the receiver to locate the line also depends on the impedance of the line, which can vary widely from location to location.

Therefore, there is a need for transmitters in line locator systems which result in magnetic signals which are independent of the impedance of the underground line.

SUMMARY

In accordance with the present invention, a transmitter for an underground line locator system which provides a constant output to the underground line is presented. The effects of the impedance of the underground line, therefore, is minimized. In some embodiments, the electrical power, current or voltage output of the transmitter can also be controlled. A transmitter according to the present invention includes a source that produces a substantially constant current when coupled to an underground line for a range of impedances of the underground line. In some embodiments, once an upper limit of voltage or power is reached, the voltage or power is held constant by the source instead of the current.

In some embodiments of the present invention, the transmitter is coupled directly, or conductively, to the line to be located. In some embodiments, the transmitter is designed to be a constant-current source, whereby the electrical current output from the transmitter does not depend on the impedance of the line over some finite range in impedance, even if the impedance changes during operation. In some embodiments, the transmitter incorporates a feedback control system, wherein the electrical voltage generated by the transmitter is changed to maintain a constant current in the target line.

In some embodiments, the transmitter monitors the current and voltage of the output and adjusts the voltage to provide a constant current essentially independent of the resistance of the line. In some embodiments, the transmitter holds the voltage to within preset limits of voltage or so as to fall within a range of power. Preset limits of power and voltage may be set by a user of the line locator system, or may be preset in the line-locator system. If the resistance of the line is such that the voltage required to achieve the desired current exceeds the preset limit, then the transmitter changes from constant current output to constant voltage output, and the current is allowed to decrease as required to maintain the maximum voltage. If the resistance of the line is such that the power output of the transmitter exceeds a preset limit, then the voltage is decreased such that the power does not exceed its limit. These embodiments allow operation of the transmitter as a constant-current source and additionally limit the maximum voltage that will be applied to the underground line, so that the line will not be damaged, or limit the maximum power applied to the line, to insure compliance with the regulations of the Federal Communications Commission or other regulatory body.

These and other embodiments are further discussed below with respect to the following claims.

BRIEF DESCRIPTION OF THE DRAWINGS

In the figures, elements having the same identifying designation have the same or similar function.

DETAILED DESCRIPTION

There is a significant improvement in line location utilizing a transmitter according to the present invention, which results in a constant and known generated magnetic signal from the underground line for a broad range of impedance of that line. Since the current, and not the power or voltage, in the underground line determines the strength of the generated magnetic field, and therefore the success and accuracy with which the line can be located, generating a constant current is an efficient and effective way of energizing an underground line in order to facilitate its location by a receiver of a line locator system. Using more current than is necessary results in reducing the life of the battery that powers the transmitter. Using too little current reduces the performance of the receiver and its ability to accurately locate the underground line.

In some embodiments, the voltage applied to the target underground line is also controlled so as not to damage the line or equipment attached to the line. In those embodiments, the current is controlled to remain constant as the impedance of the line changes, but the voltage is also monitored to insure that the voltage applied to the line does not exceed a maximum value. Finally, in various countries throughout the world, there are regulations concerning the maximum power that can be applied to an underground line. Therefore, in addition to monitoring the output current in order to keep that current constant, some embodiments also monitor the power applied to the underground line so that a maximum power limit is not exceeded. Controlling the transmitter as described above and in a manner that gives constant and repeatable performance as the impedance of the target underground line changes provides for efficient use of battery power and insures optimum performance of the locator system over a wide range in impedance of the target underground line.

The transmitters of line locators can be connected to the target line directly (conductively) or inductively. When the transmitter is connected inductively, an antenna within the transmitter is driven by the electronics within the transmitter in order to generate a magnetic field that induces the current in the target line. If the current in the inductive antenna is not controlled, there are two difficulties that can arise. First, the current induced in the target line can vary depending on the presence of metallic or conducting objects in the ground near the target line. This variation will result in a variation of the signal in the receiver that may interfere with determining the location of the target line. Second, the current in the antenna may increase, possibly to the point of destroying the transmitter electronics due to excessive heating, especially if the transmitter is placed on or near a metallic object such as a metal plate. In some embodiments of the invention, the current into the antenna of the transmitter is controlled to be constant regardless of the presence of conducting objects located close to the antenna. The transmitter electronics, then, eliminates changes in the current within the target line due to the presence of metallic objects, and prevents the transmitter from being damaged or destroyed if placed on or near a metallic surface.

Figure 1:
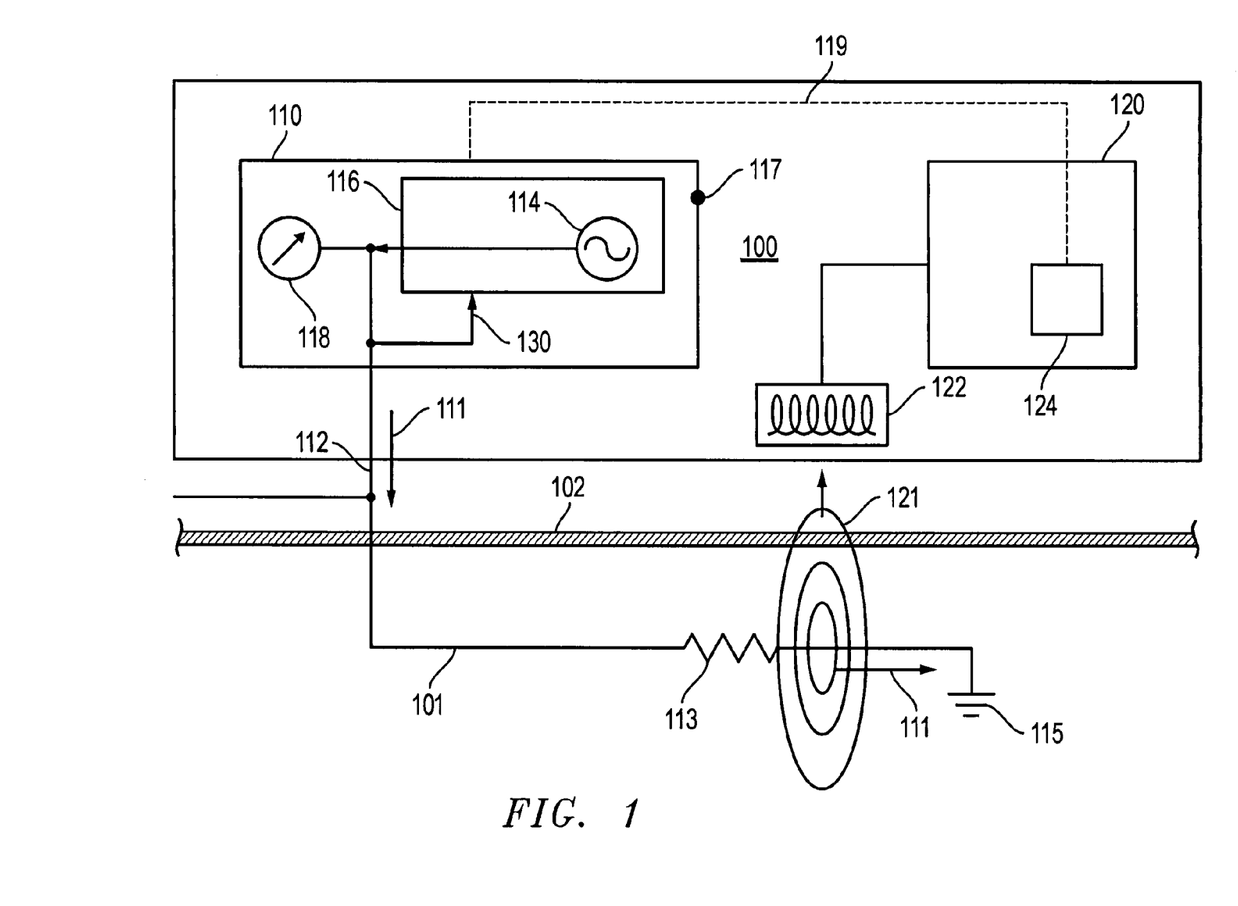
FIG. 1 shows a schematic diagram of a line locator system with an embodiment of a transmitter according to the present invention directly connected to an underground line.

FIG. 1 is a schematic diagram of an embodiment of a line locator system 100. Line 101, located under surface 102, is to be located. Underground line 101 can be any underground current carrying structure, including pipes and wires. Line locator system 100 includes transmitter 110 and receiver 120. FIG. 1 is illustrative of an embodiment of a direct connection mode locator; transmitter 110 supplies current 111 directly to line 101 by conductive lead 112.

Current 111 flows through line 101 generating electromagnetic field 121. An impedance 113 is shown symbolically as an impedance in line 101, and an electrical ground potential is symbolized by electrical ground 115. In some embodiments, current 111 is direct current (DC) and electromagnetic field 121 is therefore constant (static). In embodiments where current 111 is time-varying, electromagnetic field 121 will also be time varying (dynamic). Some embodiments of the present invention use a time-varying signal (e.g., radio carrier wave or modulated electronic signal) in order to apply detection techniques available for time varying fields (e.g. band filtering, synchronous detection).

Magnetic field 121 is detected by detecting element 122, which can, for example, be a coil, antenna, or magnetometer, of receiver 120. Receiver 120 communicates the strength of magnetic field 121 to an operator. Some embodiments of receiver 120 can include multiple detector elements 122, for example, multiple coils that may have selective orientations and thus determine a position of receiver 120 relative to the electromagnetic field produced by current 111. Relative position and/or electromagnetic field strength can be communicated by, for example, visual display 124. Visual display 124 can include, for example, a text screen (e.g., an LCD display), a meter, or an audio signal. Examples of embodiments of receiver are included in U.S. Pat. No. 6,130,539, "Automatic Gain Control for a Line Locator", issued Oct. 10, 2000, to Steven Polak, assigned to the same assignee as is the present disclosure, herein incorporated by reference in its entirety; and U.S. application Ser. No. 09/136,767, filed Aug. 19, 1998, "Line Locator with Accurate Horizontal Displacement Detection", by Gopalakrishnan Parakulam and Steven Polak, assigned to the same assignee as is the present application, herein incorporated by reference in its entirety.

Transmitter 110 includes a current controlled current source 116. Current controlled current source 116 includes generator 114 and accompanying circuitry. Current source 116 controls current 111 to be roughly constant over a range of impedance values for line 101. In some embodiments, source 116 can monitor the value of current 111 and communicate that value to meter 118, which could be an electronic display, or through interface 119, an interface to display 124. Meter 118 may, in some embodiments, monitor the current output of source 116.

In some embodiments the level of current 111 produced by source 116 can be set by control 117, which may be a factory preset, a knob, or another control interface. In some embodiments, transmitter 110 can be controlled through communications link 119 from receiver 120. Communications link 119 can be wireless or direct connection (e.g., by electrical wire).

In some embodiments of the invention, feedback 130 is provided to current source 116 so that the current can be directly controlled. In some embodiments, a source 116 is a passive source which holds current 111 constant without feedback 130. In some embodiments, voltage across line 101 or power input to line 101 can be monitored through feedback 130 and current 111 may be clipped to insure that the voltage or power remain between predetermined limits of operation.

Figure 2:
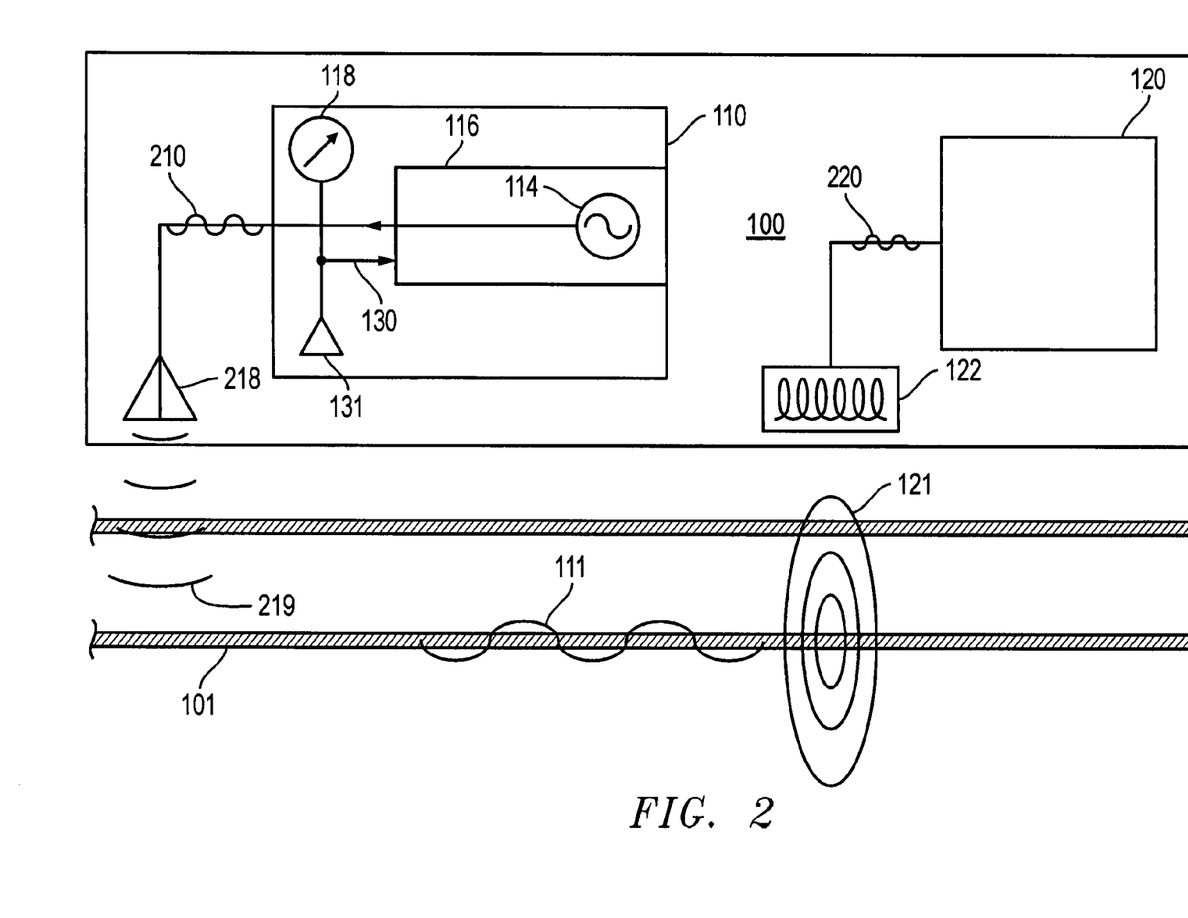
FIG. 2 shows a schematic diagram of a line locator system with an embodiment of a transmitter according to the present invention inductively coupled to an underground line.

FIG. 2 shows a schematic of an embodiment of transmission system 100 using inductive coupling to generate current 111. Generator 114 and other transmitter electronics create signal 210. Signal 210 is radiated by antenna 218 to line 101. In some embodiments, current controller 116 controls the output power of signal 210. In some embodiments, current controller 116 controls current passing through components of transmitter 110. In some embodiments, signal 210 is a square wave, which can save power and reduce complexity in signal generator 250. Other embodiments make use of other waveforms.

Field 219 generates current 111 in underground line 101 by electromagnetic induction. Current 111 generates electromagnetic field 121 from line 101. Electromagnetic field 121 is detected by means of detecting element 122 (e.g., an antenna or coil) and receiver 120, which communicates the information to the operator.

The power output of transmitter 110 is equal to the product of the resistance of the line times the square of the current in the line 111. In some embodiments, of both direct connection and inductive mode transmitters, current is controlled so as to keep total power output by transmitter 110 below a threshold. This threshold, for example, can be a regulatory limit (e.g., a radiated power limit set by the Federal Communications Commission (FCC)).

Figure 3:
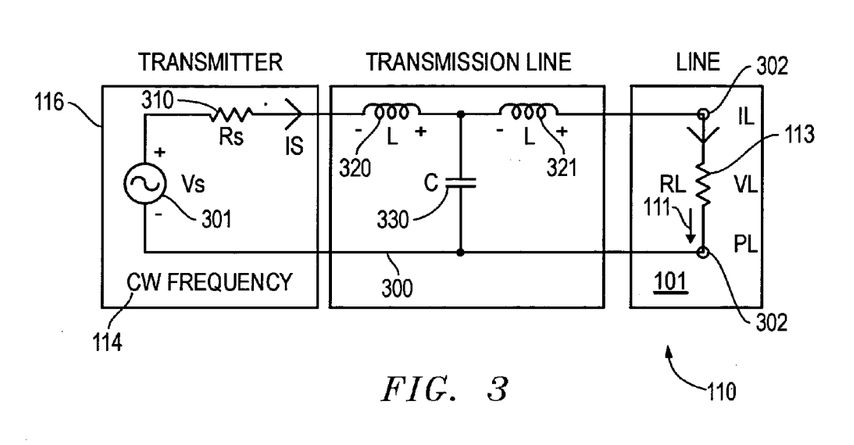
FIG. 3 shows a schematic of a transmitter according to the present invention with a transmission line circuit to passively maintain a constant current in an underground line connected to the transmitter over a range in the impedance of the underground line.

FIG. 3 shows a schematic diagram of an embodiment of a current controlled transmitter 110 coupled to underground line 101. Transmitter 110 includes current source 116, which includes generator 114 and transmission line 300. Generator 114 includes a source 301 and internal impedance 310. Transmission line 300 receives the output signals from generator 114 and maintains a relatively constant current over a range of impedance of underground line 111. The impedance of transmission line 300 can be set equal to the geometric mean of the low and high limits to the impedance of underground line 111. In some embodiments, transmission line 300 functions as a low-pass filter to select the fundamental frequency of a square-wave excitation received from generator 114, whereby the output of the transmission line is a sinusoidal waveform.

Figure 4:
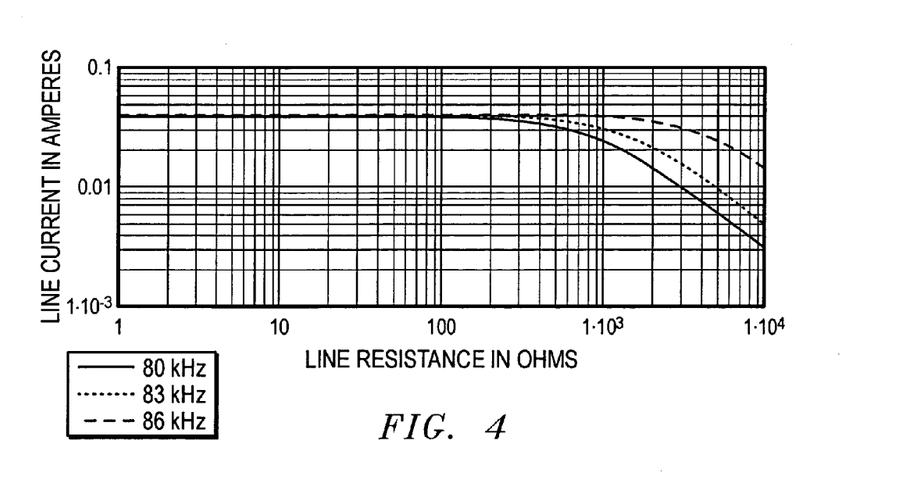
FIG. 4 shows a graph of the electrical current in the underground line in an embodiment of a transmitter such as that shown in FIG. 3 as a function of the impedance of the line for three frequencies of transmitter excitations.

FIG. 4 shows a graph of predicted performance of an embodiment of transmitter 110 shown in FIG. 3. As seen from FIG. 4, transmitter 110 holds a constant current for variation in resistance 113 of line 101 from about 1 to about 1,000 Ohms for transmitter 110 operating at 80, 83 and 86 kHz. In this example of the embodiment shown in FIG. 3, capacitor 330 can be a C=0.015 uF, Panasonic series ECQ-E(F), Digikey Part Number EF2153-ND 10, of dimension 3 mm wide×7.5 mm tall×4.4 mm thick. Inductors 320 and 321 can each be an L=220 uH, Toko Type 10RHB2, Digi-key part number TK5168-ND, of size 10.5 mm diameter×15.5 mm tall. Transmitter 110 is coupled to line 101 through terminals 302.

Figure 5:
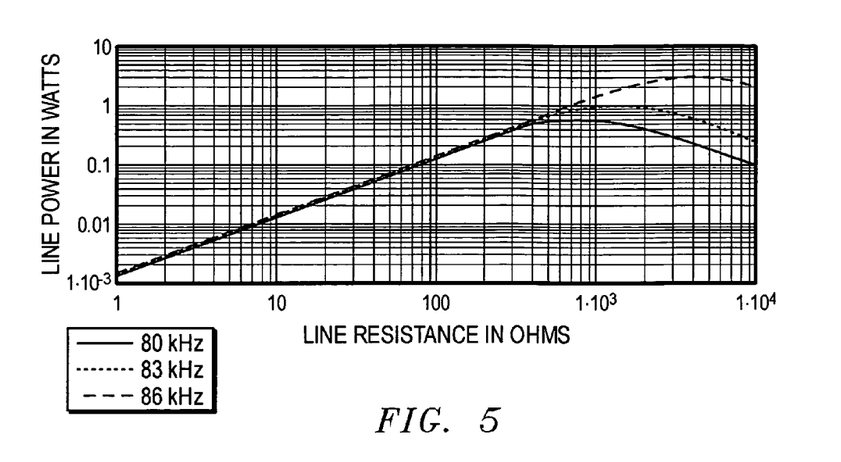
FIG. 5 shows a graph of the power applied to the underground line by a transmitter as shown in FIG. 3 as a function of the resistance of the line for three operating frequencies of the transmitter.
Figure 6:
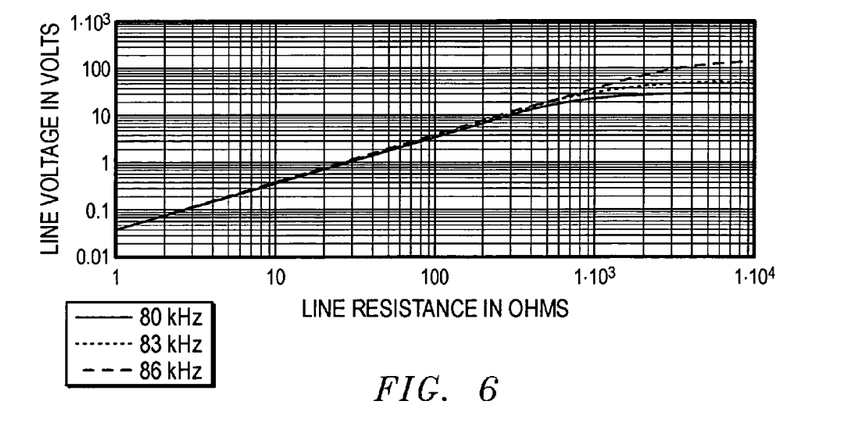
FIG. 6 shows a graph of the electrical voltage applied across an underground line by a transmitter such as that shown in FIG. 3 as a function of the impedance of the line for three operating frequencies of the transmitter.

FIG. 5 shows the power in line 101 as a function of impedance 113 for transmitter frequencies of 80, 83 and 86 kHz of the embodiment of transmitter 110 shown in FIG. 3. FIG. 6 shows the line voltage across line 101 as a function of impedance 113 for transmitter frequencies of 80, 83 and 86 kHz of the embodiment of transmitter 110 shown in FIG. 3. As shown in FIG. 6, the voltage (and therefore the power as shown in FIG. 5) is a linear function of line impedance 113 in the range of impedance between about 1 and about 1000 Ohms.

In some embodiments, as shown in FIGS. 5 and 6, either power or voltage can be monitored, for example through feedback 130, in order to maintain the power or voltage within set limits. In some embodiments, source 116 includes circuitry which receives a signal indicating either power or voltage through feedback 130 and, if the set limit of power or voltage is exceeded, reduces current 111 accordingly. In some embodiments, this can be accomplished by reducing the current until the power or voltage is again within the set limits. Therefore, in such embodiments, current 111 is constant until the limit on power or voltage is reached, at which point the current is reduced such that the power or voltage remains below the limit.

In some embodiments, current 111 is controlled by controlling the voltage across line 101. In some embodiments, once the voltage across line 101 reaches an upper limit, the voltage is held constant unless the current or power exceed their upper limits.

In some embodiments, transmitter 110 may include monitor 118 (FIGS. 1 and 2) which monitors the output current, the voltage, or the power from source 116. In some embodiments, monitor 118 may receive information regarding current 111, voltage or power from other sources. In some embodiments, the signals measured by monitor 118 can be provided to feedback 130 in order to control source 116.

Figure 7:
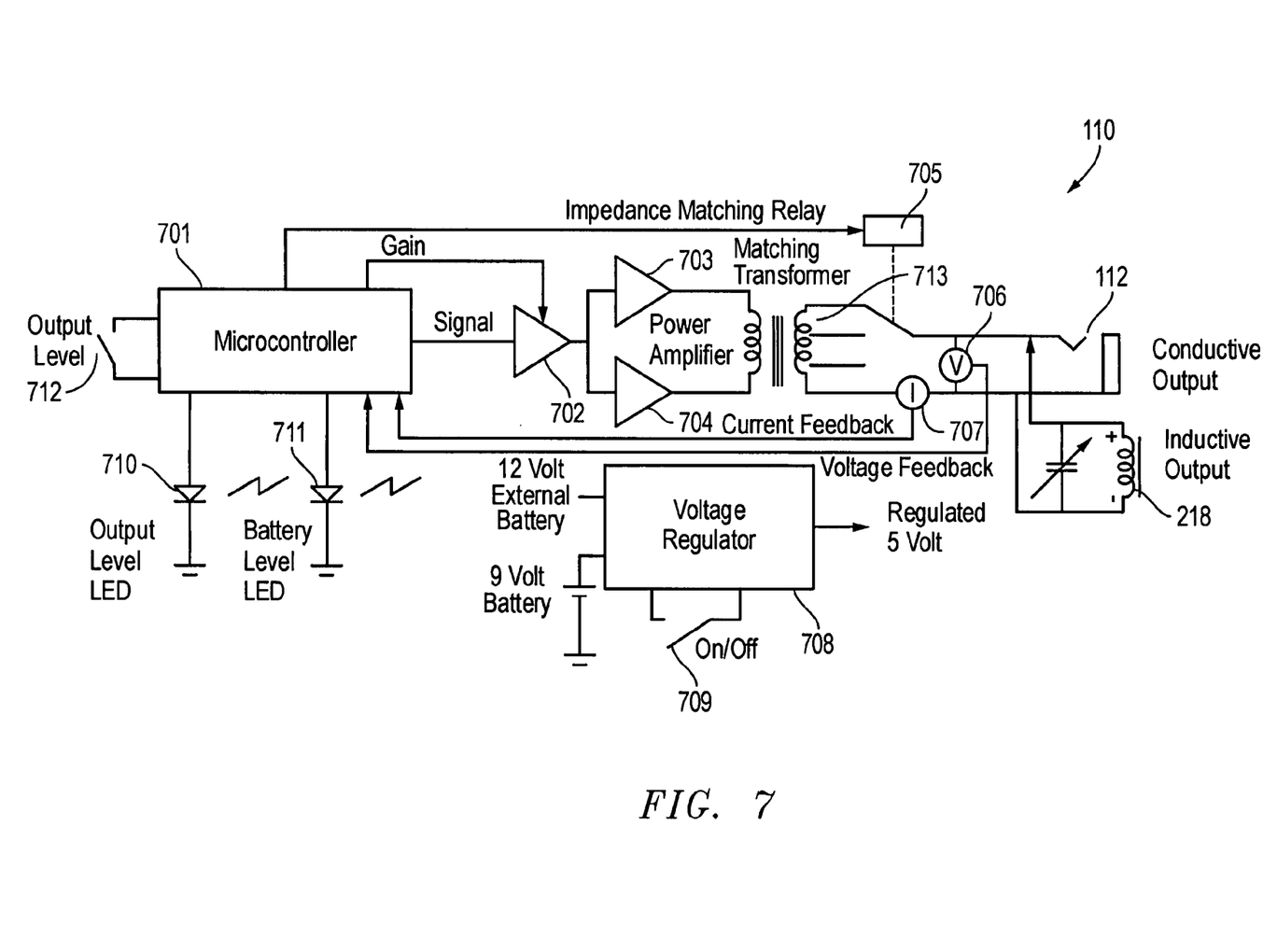
FIG. 7 shows a block diagram of an embodiment of the present invention wherein the output of the transmitter is monitored in order to control the transmitter to produce a constant output.

FIG. 7 shows an embodiment of a transmitter 110 according to the present invention with active monitoring and feedback. Transmitter 110 of FIG. 7 shows both a coupling line 112 for direct connection to line 101 (see, e.g., FIG. 1) and an antenna 218 for inductively coupling energy to line 101 (see, e.g., FIG. 2), either of which may be chosen as the output mode. Transmitter 110 further includes a microcontroller 701 which receives feedback signals and, in turn, generates control signals for holding an output signal constant even if the load of line 101 changes.

Microcontroller 701 generates a sinusoidal signal of a particular frequency which is input to amplifier 702. The gain of amplifier 702 is controlled by microcontroller 701. The output signal from amplifier 702 is input to power amplifier 703 and inverting power amplifier 704. The output signals from amplifiers 703 and 704 are input to the primary of an impedance matching transformer 703. The output signal taken from selected taps of the secondary of impedance matching transformer 713 are coupled either into direction connection 112 or into antenna 218 to couple energy into line 101. The taps of the secondary of transformer 713 are selected through an impedance matching relay 705 which is controlled by microprocessor 701.

The voltage across the selected taps is monitored by a voltmeter 706 and a voltage signal from voltmeter 706 is input to microcontroller 701. Similarly, the current flowing through the secondary of transformer 713 is monitored by current meter 707 and a current signal from current meter 707 is input to microcontroller 701.

Power can be supplied to transmitter 110 through voltage regulator 108. Power switch 709 can be utilized to turn on and off transmitter 110. Further, microcontroller 701 may indicate output level and battery level through output level LEDs 710 and battery level LEDs 711, respectively. The output level of the output signal to direct coupling 112 or antenna 218 can be controlled with switch 712, which inputs a control signal to microcontroller 701.

Therefore, microcontroller 701 receives a current signal from current meter 707, a voltage signal from volt meter 706, and an output level signal from output level switch 712. Based on the current signal, the voltage signal, and the output level signal, microcontroller 701 can set the gain of amplifier 702 and select the taps of the secondary of transformer 713. Microcontroller 701 also provides a signal to amplifier 702 which has the selected frequency of the output signal coupled to line 101.

In some embodiments, microcontroller 701 can start by setting a fixed gain for amplifier 702, which can be a low gain, and adjusting the impedance matching relay to maximize the power output of the output signal from transformer 713. Microcontroller 703 then adjusts the gain of amplifier 702 so that a property of the output signal from transformer 713 matches that level selected by the output level signal. In some embodiments, the current is held constant at a value selected by the output level signal. In some embodiments, the power or voltage can be held constant. The output signal can then be held constant regardless of changes in the impedance of line 101.

In some embodiments, the current signal is held constant provided that the voltage or the power remains within a prescribed window. If the voltage or power becomes too high, then the gain of amplifier 702 can be reduced, thereby reducing the current signal and the voltage or of the output signal, such that the voltage or power stays within the prescribed window.

Other embodiments of the present invention may make use of many types of current circuits and methods to carry out the current control function. The embodiments bed above are exemplary only and are not intended to be limiting. One skilled in the art cognize various possible modifications that are intended to be within the spirit and scope disclosure. As such, the invention is limited only by the following claims.

We claim:

1. A transmitter of a line locator system, comprising:
    a generator that can be coupled to an underground line;
    an output controller coupled to the generator;
    wherein the transmitter of the line locator system provides a constant output signal within the underground line over a range of impedance values of the underground line so that a receiver of the line locator system can detect the approximate location of the underground line.

2. The transmitter of claim 1, wherein the constant output signal is electrical current through the underground line.

3. The transmitter of claim 2, wherein the electrical current through the underground line is controlled by the output controller by varying a voltage that the generator applies across the underground line.

4. The transmitter of claim 2, wherein the output controller limits the electrical current such that a power supplied to the underground line does not exceed a preset limit.

5. The transmitter of claim 2, further including a voltage monitor coupled to the generator that limits the electrical current if a voltage that the generator applies across the underground line exceeds a maximum value.

6. The transmitter of claim 1, wherein the constant output signal is voltage across the underground line.

7. The transmitter of claim 1, wherein the constant output signal is power applied to the underground line.

8. The transmitter of claim 1, wherein the transmitter can be directly coupled to the underground line.

9. The transmitter of claim 1, wherein the transmitter can be inductively coupled to the underground line.

10. The transmitter of claim 1, wherein the generator is a square wave generator and the output controller includes a low-pass filter.

11. The transmitter of claim 10, wherein the low pass filter includes at least one inductor and a capacitor coupled to filter the constant output signal from the generator.

12. A line locator transmitter of a line locator system comprising:
    a current source comprising a control input and a current output, wherein said current source is capable of producing an output current at said current output responsive to a signal at said control input;
    a current controller, capable of sending a control signal to the control input of said current source to maintain said output current at a constant level; and
    an interface, coupled with said current output, wherein said interface is capable of connecting to an external line,
    wherein a receiver of the line locator system can receive a signal from the external line that is related to the output current.

13. The line locator transmitter of claim 12, wherein said current controller further comprises an operator interface, wherein said constant level can be set at said operator interface.

14. The line locator transmitter of claim 12, further comprising means for communicating said output current to an operator.

15. The line-locator transmitter of claim 12 wherein said current source supplies direct current (DC).

16. The line-locator transmitter of claim 12 wherein said current source supplies time varying current.

17. A line-locator transmitter of a line locator system comprising:
    transmitting electronics comprising an output and a control input, wherein said transmitting electronics direct power to said output, responsive to a signal at said control input, wherein the output can be sent through the underground line so that a receiver of the line locator system can locate the underground line;
    an output sampling interface coupled to said output, producing an output signal in response to a sampling of said power directed to said output; and
    a feedback controller, coupled to said output sampling interface and said control input, wherein said feedback controller sends a signal to said control input, responsive to said output signal.

18. The line-locator transmitter of claim 17, wherein the power directed to said output is directly coupled to a line to be located.

19. The line-locator transmitter of claim 17, wherein the power directed to said output is inductively coupled to a line to be located.

20. The line-locator transmitter of claim 17 wherein the power directed to said output is controlled such that it does not depend on electrical properties of an environment in which the line-locator transmitter operates.

21. A line locator system comprising:
a transmitter of the line locator system, said transmitter comprising:
signal generating circuits having a control input, the signal generating circuits being capable of generating a transmitted signal;
an antenna, coupled to said signal generating circuits for radiating said transmitted signal as an electromagnetic field, capable of causing a line to be located to re-radiate an induced electromagnetic field; and
a feedback controller coupled to said control input comprising a means to generate a control signal, responsive to power directed to said antenna, thereby to regulate power radiated by said antenna; and
a receiver of the line locator system, capable of detecting said induced electromagnetic field radiated by said line to be located.

22. The line locator system of claim 21, wherein means to generate the control signal comprise a sampling input for measuring a parameter of said transmitter.

23. The line locator system of claim 21, wherein means to generate the control signal comprise an electromagnetic field sensor capable of directly measuring power transmitted from said antenna.

24. A method for producing a desired electromagnetic field around a line to be located, comprising:
coupling a current source to a portion of said line to be located; and
controlling an amount of current transmitted by said current source through said line to be located to be roughly independent of an impedance of said line, wherein a receiver of a line locator system can locate the line based on the transmitted current through the line.

25. The method of claim 24, wherein said coupling is a direct connection.

26. The method of claim 24, wherein said coupling is inductive.

27. The method of claim 24, wherein said controlling is accomplished by a filter circuit.

28. The method of claim 24, wherein said controlling is accomplished by a feedback circuit.

29. The method of claim 24, further comprising selecting a value of said amount of current.

30. The method of claim 24, wherein said amount of current is selected to be less than a preset limit.

31. The method of claim 24, further comprising monitoring said amount of current transmitted.

* * * * *